Patented Aug. 29, 1944

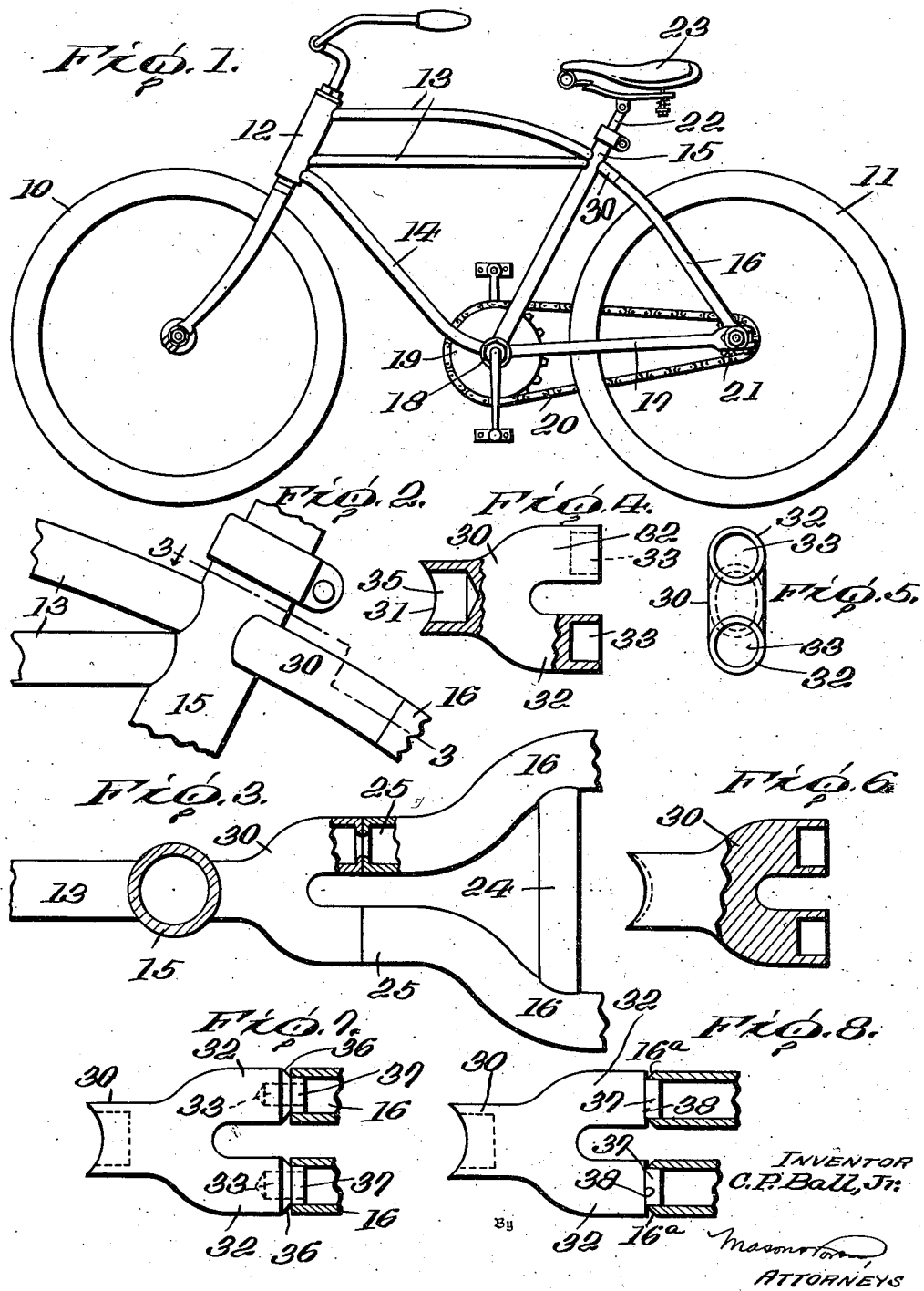

2,356,732

UNITED STATES PATENT OFFICE 2,356,732

METHOD OF FORMING SEAT MAST CLUSTERS AND LIKE STRUCTURES, AND PRODUCT THEREOF

Charles P. Ball, Jr., Torrington, Conn., assignor to The Torrington Company, Torrington, Conn., a corporation of Maine Application November 17, 1941, Serial No. 419,490

7 Claims. (Cl. 280—281)

In forming the frames for bicycles and like devices, it is customary to employ tubing for the structural members, and difficulty is encountered in obtaining satisfactory connections between some of the individual structural elements.

This difficulty is especially encountered at the top of the bicycle seat mast where four or more frame members must be joined, as for example when the upper and lower horizontal rails of the bicycle frame and the upper rear fork tubes are joined to the seat mast.

It has now been found that by preparing a sub-assembly of these upper rear fork tubes and a connecting member, this connecting member can be easily joined to the seat mast itself, strong clean joints for the entire structure can be quickly produced without the forming of any substantial amount of external "flash," and the final article has a strong and rigid connection of its several parts.

One of the features of the present invention is that of providing a method and arrangement by which a multiplicity of structural tubes may be connected by resistance welding upon engagement for limited areas and with the presentation of limited masses to be heated to the necessary plasticity for welding.

Illustrative forms of practicing the present invention are set out in the accompanying drawing in which:

Figure 1 is a side elevation of a bicycle including a structure according to the present invention.

Figure 2 is an enlarged side elevation of a cluster according to this invention.

Figure 3 is the top view showing a connecting member between the upper rear fork tubes and the seat mast with parts in section substantially on line 3—3 of Figure 2.

Figure 4 is a top view of the connecting member.

Figure 5 is a rear end view of the same.

Figure 6 is a cross sectional view of a modified form of connecting member.

Figures 7 and 8 are cross sectional views of other modified forms of a connecting member.

A current practice in joining the upper rear fork tubes to the seat mast is to bring these tubes together at an acute angle, cutting away their sides and ends to conform to one another and to the seat mast. Such a structure cannot be satisfactorily resistance-welded, and if torch or electric arc welding is employed, a large amount of flash or projecting beading is formed, which must be removed to make the joint smooth and flush. Furthermore, the transverse horizontal dimension of the fork tube assembly closely adjacent the seat mast then produces an undesirable wideness of structure and interference with free leg movement of the rider.

In this drawing, the illustrated bicycle has the wheels 10, 11, the front post 12, the horizontal bars or rails 13, the lower bar or brace 14, the seat mast 15, the upper rear fork tubes 16, and the lower rear tube 17. At the junction of the seat mast 15 and the bars 14, 17 is provided a housing 18 to receive the crank shaft which carries the sprocket 19 for the driving chain 20 by which power is transmitted to a sprocket 21 connected to the rear wheel 11. The seat mast receives the seat post 22 for supporting the seat 23.

As shown more in detail in Figure 2, the seat mast 15 has the horizontal bars or rails 13 secured thereto by resistance welding.

The rear fork tubes 16 are usually circular or oval in cross section, and are connected (Figure 3) by a spacer and bracing piece 24. In practicing the present invention, it is preferred first to assemble these tubes 16 with the spacer 24, whereby the front ends 25 of the upper fork tubes 16 are held substantially parallel and at a predetermined distance from one another and have the lips of their forward ends shaped properly for the type of electric resistance welding (butt welding, flash welding, etc.) which is used, as shown by Figures 6, 7 and 8.

The connecting member 30 is formed by forging, pressing or other proper operations and as a whole is illustratively of Y-shape.

It is preferred to have the front end or shank of the connecting member 30 provided with a cavity 35 affording a cross section of metal essentially the same as that of the seat mast 15. It is also feasible to have this end solid as shown in Figure 6. The shape or profile of the front end surface 31 of the connecting member 30 is preferably chosen to conform to its intersection with the seat mast 15 and to produce little or no flash.

The bifurcated rear portion provides rear ends 32 which are illustrated as parallel and spaced apart a distance corresponding to the spacing of the upper rear fork tubes 16. These rear ends (Figure 4) are provided with cavities 33 with properly shaped lips, and are so constructed that they have internal and external shapes and sizes essentially identical with those of the parts which are to be welded thereto, whereby the parts join smoothly together and the internal cavities serve to assure uniform heating of the metal which forms the joint.

Figures 7 and 8 show modified forms of the rear ends of the connecting member 30 for different types of electrical welds. In Figure 7, the bifurcated rear ends 32 are illustrated as each having a beveled shoulder 36 leading from the outer surface inwardly to a portion 37 of smaller diameter which conforms to and fits snugly inside of the corresponding rear fork tube 16. When the fork tube is pressed onto the portion 37, a peripheral groove of triangular shape is provided, and when a uniform electric welding has been accomplished this groove becomes filled, but not substantially overfilled, with molten metal which serves to join the fork tube 16 with the connecting member 30 over the entire area, thus assuring the structure against local weakness. In the form illustrated in Figure 8, a radial surface 38 provides a shoulder which similarly cooperates with the beveled edge 16a of the corresponding fork tube 16 when the latter is placed upon the reduced portion 37 which similarly is conformed to the inside of the end cross section of the fork tube 16. The reduced portions or stubs 37 serve to guide and maintain the parts for alignment. In these forms of construction also cavities 33 may be provided.

These connecting members 30 are utilized for joining a plurality of members, and may be supplied as units for the purpose of making such connections.

The next step of assembly is to bring the upper fork tube or tubes 16 into the proper relationship with the ends 32 of the connecting member and weld the parts together by the appropriate electric-resistance procedure.

This sub-assembly of fork tubes and connecting member is then presented to the seat mast which is positioned at an angle to the plane of the fork tubes, the end 31 of the connecting member being pressed against the seat mast at a proper point, and suitably welded by electric resistance procedure.

These operations are preferably controlled by the employment of jigs and fixtures which guide and hold the parts so that they are presented to one another accurately at predetermined points and under the predetermined conditions for effecting the welding.

This assembly assures greater strength, with a neat and light appearance, and, as shown in Figure 3, affords a desirable narrowness of the upper rear structure beneath the saddle, thus increasing the working space for the rider's legs.

It will be understood that the invention is not limited to the form of practice or to the specific embodiment of steps and article as set forth above, but may be modified in many ways within the scope of the appended claims.

I claim:

1. The method of forming a seat mast cluster for bicycles and like frames, which comprises preparing a seat mast, preparing a connecting member having a bifurcated rear end with cavities opened at the ends of the bifurcations and having a front end essentially conformed to the mast, preparing fork tubes having internal and external shapes and sizes essentially identical with those of the ends of the bifurcations, electric welding said fork tubes to the connecting member, and welding the front end of the connecting member to the seat mast.

2. A seat mast construction for bicycles and like frames, which comprises a seat mast, a connecting member welded at its front end to the mast and having a bifurcated rear end, and upper fork tubes welded to the ends of the bifurcations; said bifurcations and fork tubes having internal cavities providing annular cross sections with internal and external shapes and sizes which are essentially identical, and being welded together for the areas of said cross sections.

3. A seat mast construction for bicycles and like frames, which comprises a seat mast, upper rear fork tubes, a connecting member welded at its front end to the mast and having a bifurcated rear end to provide spaced and substantially parallel end portions each having a terminal cross section essentially identical in size and shape with the end of the corresponding fork tube and welded thereto.

4. A seat mast construction for bicycles and like frames, which comprises a seat mast, upper rear fork tubes, a connecting member welded at its front end to the mast and having a bifurcated rear end to provide spaced and substantially parallel end portions each having a terminal cross section of annular form essentially identical in size and shape with the end of the corresponding fork tube and welded thereto.

5. A seat mast construction for bicycles and like frames, which comprises a seat mast, upper rear fork tubes, a connecting member welded at its front end to the mast and having a bifurcated rear end to provide spaced and substantially parallel end portions each having a terminal cross section including a reduced portion fitting within the corresponding fork tube and having its end surface outside said reduced portion of essentially the identical size and shape of the end of the corresponding fork tube and welded thereto.

6. A seat mast construction for bicycles and like frames, which comprises a seat mast, upper rear fork tubes, a connecting member having a front shank of substantially the same horizontal dimension as the seat mast and welded a its front end to the mast and having a bifurcated rear end to provide spaced and substantially parallel end portions each having a terminal cross section essentially identical in size and shape with the end of the corresponding fork tube and welded thereto, said shank affording leg space rearward of the seat mast.

7. The method of forming a seat mast cluster for bicycles and like frames, which comprises preparing a seat mast, preparing a connecting member having a bifurcated rear end with cavities opened at the ends of the bifurcations and having a front end with a cavity therein and with its edge essentially conformed to the mast, preparing fork tubes having internal and external shapes and sizes essentially identical with those of the ends of the bifurcations, electric resistance welding said fork tubes to the connecting member, and electric resistance welding the front end of the connecting member to the seat mast.

CHARLES P. BALL, Jr.